(12) United States Patent
Tallino

(10) Patent No.: US 8,960,340 B2
(45) Date of Patent: Feb. 24, 2015

(54) POWER ADD-ON DEVICE FOR MANUAL WHEELCHAIR

(71) Applicant: Patrick Tallino, Lake Elsinore, CA (US)

(72) Inventor: Patrick Tallino, Lake Elsinore, CA (US)

( * ) Notice: Subject to any disclaimer, the term of this patent is extended or adjusted under 35 U.S.C. 154(b) by 0 days.

(21) Appl. No.: 13/783,175

(22) Filed: Mar. 1, 2013

(65) Prior Publication Data

US 2013/0240271 A1   Sep. 19, 2013

Related U.S. Application Data

(63) Continuation-in-part of application No. 12/788,147, filed on May 26, 2010, now Pat. No. 8,430,189.

(60) Provisional application No. 61/181,602, filed on May 27, 2009.

(51) Int. Cl.
*A61G 5/04*  (2013.01)
*B62B 5/00*  (2006.01)
*A61G 5/10*  (2006.01)

(52) U.S. Cl.
CPC  *A61G 5/04* (2013.01); *A61G 5/047* (2013.01); *B62B 5/0079* (2013.01); *A61G 5/043* (2013.01); *A61G 2203/14* (2013.01); *A61G 2005/1054* (2013.01)
USPC ............... 180/11; 180/65.1; 180/22; 267/41; 267/158

(58) Field of Classification Search
CPC . A61G 5/047; A61G 5/04; A61G 2005/1054; A61G 2203/14; A61G 5/043
USPC ............. 180/68.5, 15, 65.1, 22, 907, 12, 13, 180/214; 188/2; 267/229, 165, 158, 262, 267/46, 45, 43, 41; 403/381
See application file for complete search history.

(56) References Cited

U.S. PATENT DOCUMENTS

| | | |
|---|---|---|
| 4,759,418 A | 7/1988 | Goldenfeld et al. |
| 5,050,695 A | 9/1991 | Kleinwolterink et al. |
| 5,113,959 A | 5/1992 | Mastov et al. |
| 5,125,468 A | 6/1992 | Coker |
| 5,135,063 A | 8/1992 | Kropf |
| 5,222,567 A | 6/1993 | Broadhead et al. |
| 5,234,066 A | 8/1993 | Ahsing et al. |
| 5,350,032 A | 9/1994 | Smith |
| 5,351,774 A | 10/1994 | Okamoto |
| 5,494,126 A | 2/1996 | Meeker |
| 5,495,904 A | 3/1996 | Zwaan et al. |

(Continued)

*Primary Examiner* — Joseph M Rocca
*Assistant Examiner* — Jacob Knutson
(74) *Attorney, Agent, or Firm* — Kregg A. Koch; Proven Patents Law Firm

(57) ABSTRACT

A power add-on device for powering a manual wheelchair includes a motorized component including dual electric motors and a power source electrically coupled to the electric motors, wherein each of the motors is configured to turn a respective one of a set of drive wheels. The power add-on device includes a latching mechanism adapted to attach the power add-on device to the camber tube of the manual wheelchair; and a controller, reachable by a person sitting in the manual wheelchair, that controls the latching mechanism, the motors, and a swing arm that allows the rear wheels of the manual wheelchair to be lifted off the ground. The front wheels of the manual wheelchair are allowed to be lifted several inches off the ground to avoid obstacles, or can be lifted by the user leaning back. Advantageously, the power add-on device can be detached from the manual wheelchair and loaded into the trunk of a car when travelling or may be checked in as baggage when flying.

33 Claims, 19 Drawing Sheets

(56) References Cited

U.S. PATENT DOCUMENTS

| | | | |
|---|---|---|---|
| 5,531,284 A * | 7/1996 | Okamoto | 180/65.1 |
| 5,651,422 A | 7/1997 | Casali | |
| 5,988,304 A | 11/1999 | Behrendts | |
| 6,059,060 A | 5/2000 | Kanno et al. | |
| 6,481,514 B2 * | 11/2002 | Takada | 180/11 |
| 6,766,871 B2 | 7/2004 | Sawyer | |
| 6,860,347 B2 | 3/2005 | Sinclair et al. | |
| 6,896,079 B1 | 5/2005 | Axelsson | |
| 6,935,448 B2 * | 8/2005 | Goertzen et al. | 180/65.1 |
| 7,032,917 B1 * | 4/2006 | Chelgren | 280/304.1 |
| 7,104,346 B2 | 9/2006 | Schaffner | |
| 2002/0088657 A1 | 7/2002 | Brett et al. | |

* cited by examiner

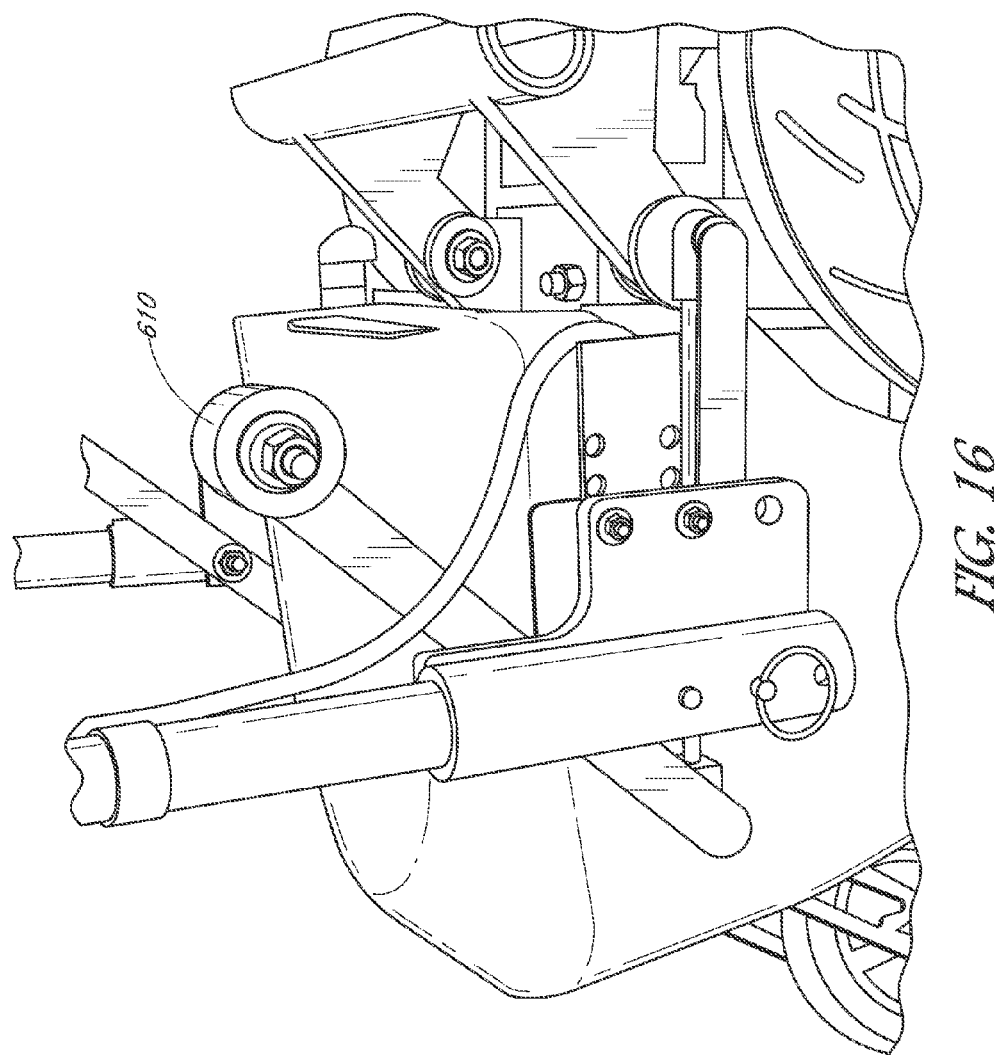

POWER ADD-ON DEVICE FOR MANUAL WHEELCHAIR

CROSS-REFERENCE TO RELATED APPLICATIONS

This application is a continuation-in-part of U.S. patent application Ser. No. 12/788,147, filed on May 26, 2010 (entitled "Power Add-On Device For Manual Wheelchair"), which claims the benefit under 35 U.S.C. §119 of U.S. Provisional Patent Application No. 61/181,602 filed by Patrick Tallino on May 27, 2009 and entitled "Power Add-On Device For Manual Wheelchair", the entirety of each of which is hereby incorporated by reference as if fully set forth herein.

BACKGROUND OF THE INVENTION

1. Field of the Invention

The present invention relates to an auxiliary power add-on attachment for a manual rigid-framed wheelchair.

2. Description of the Related Art

Most spinal cord-injured individuals with injury levels from the five cervical vertebrate down to the lumbar vertebrates use a lightweight rigid framed manual wheelchair for everyday use. However, lengthy outings or ones that require traversing uneven or sloped terrain are unrealistic and often impossible for many using manual chairs. Although electric-powered wheelchairs exist that can be used for those situations, they are not generally prescribed unless the user lacks the ability to use a manual wheelchair. Moreover, electric-powered wheelchairs tend to be expensive, heavy, and cumbersome.

Several patents disclose devices which can be attached to a manual wheelchair to electrically power the chair. For example, U.S. Pat. No. 5,494,126 to Meeker, entitled "Apparatus and Method For Attaching a Motorized Wheel to a Wheelchair", discloses a motorized wheel that can be attached to the front of a wheelchair. As another example, U.S. Pat. No. 5,496,904 to Zwaan, entitled "Wheelchair Power System", discloses a power system that can be added to a manual wheelchair to convert it to an electric-powered wheelchair.

Although such devices are somewhat useful and beneficial, the existing technology fails to provide an easy way to attach/detach a power add-on device to a conventional manual wheelchair. Furthermore, such devices fail to provide for traversal over rough terrain and adequate stability. Additionally, many such devices require modification to the manual wheelchair. Accordingly, it would be desirable and highly advantageous for there to be an auxiliary power add-on attachment for a manual wheelchair that overcomes these and other deficiencies.

SUMMARY OF THE INVENTION

In an embodiment of the present invention, a power add-on device for powering a manual wheelchair includes a motorized component including dual electric motors and a power source electrically coupled to the electric motors, wherein each of the motors is configured to turn a respective one of a set of drive wheels. The power add-on device includes a latching mechanism adapted to attach the power add-on device to the camber tube of the manual wheelchair; and a controller, reachable by a person sitting in the manual wheelchair, that controls the latching mechanism, the motors, and a swing arm that allows the rear wheels of the manual wheelchair to be lifted off the ground.

Attachment of the wheelchair to the power add-on device is accomplished simply by backing up the wheelchair into the device. To reduce tipping, the power add-on device features a front anti-tip castor wheel and a back anti-tip castor wheel. When the power add-on device is attached to the wheelchair, the front wheels can be lifted several inches off the ground when encountering obstacles or by the user leaning back. A notable design feature of the present invention is that the latching mechanism is not tightly clamped down on the camber tube; instead, it rather surrounds the camber tube, allowing the camber tube to rotate slightly as the wheelchair tilts to allow the front wheels of the manual wheelchair to be lifted. Advantageously, the power add-on device can be detached from the manual wheelchair and loaded into the trunk of a car when travelling or may be checked in as baggage when flying.

In an embodiment of the present invention, the latching mechanism includes a clamshell latching mechanism. In this embodiment, the clamshell latching mechanism includes an upper clamshell portion and a bottom clamshell portion, the upper clamshell portion and the bottom clamshell portion attached by a hinge. When the clamshell latching mechanism is in a closed position, the clamshell latching mechanism surrounds the camber tube of the manual wheelchair.

These and other aspects, features, and advantages of the present invention will become apparent from the following detailed description of preferred embodiments, which is to be read in connection with the accompanying drawings.

BRIEF DESCRIPTION OF THE DRAWINGS

FIG. 16 shows an enlarged view of the embodiment of the power add-on device shown in FIG. 10, showing the embodiment of the rotation resistance element of FIG. 13.

DETAILED DESCRIPTION OF THE PREFERRED EMBODIMENT

Figure 1:
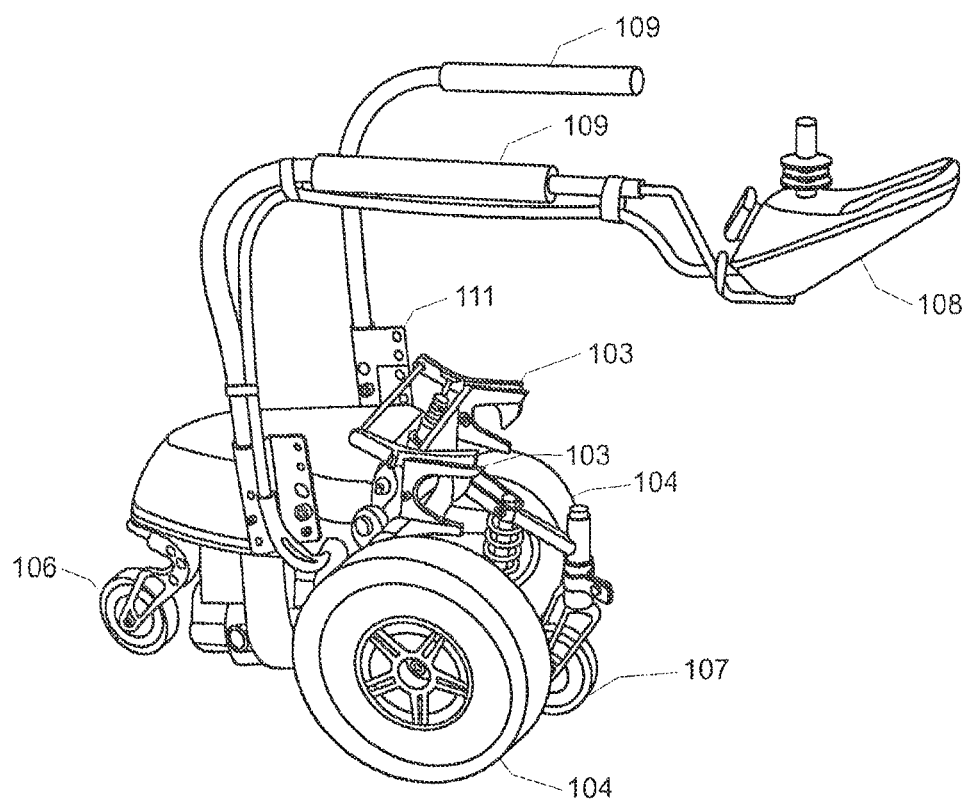
FIG. 1 shows an exemplary power add-on device for a manual wheelchair, in accordance with a preferred embodiment of the present invention.
Figure 2A:
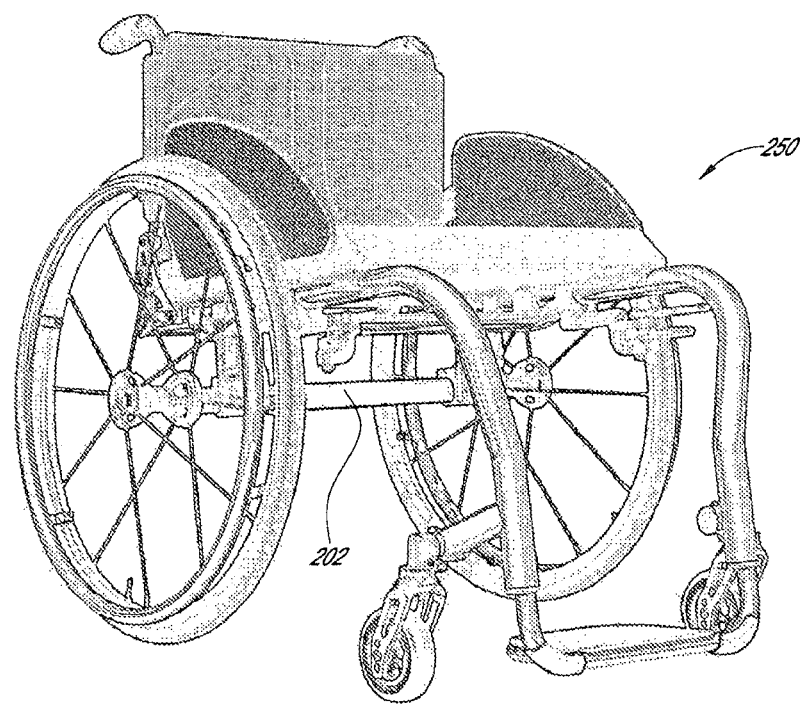
FIG. 2A shows a conventional manual wheelchair having a camber tube.
Figure 2B:
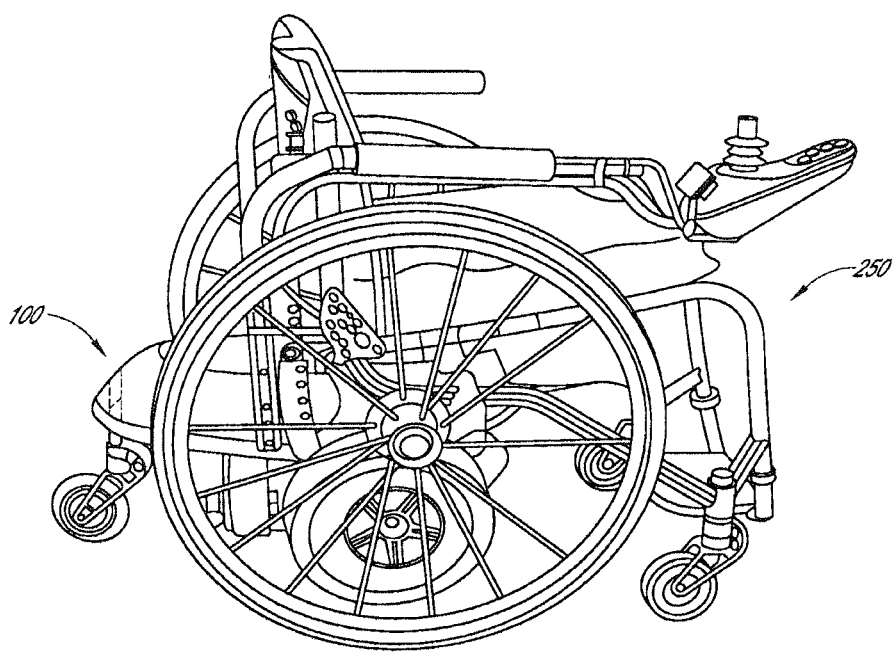
FIG. 2B shows the power add-on device of FIG. 1 attached to a conventional manual wheelchair.

FIG. 1 illustrates an exemplary power add-on device 100 useable for powering a manual wheelchair, in accordance with a preferred embodiment of the present invention. FIG. 2B illustrates the power add-on device 100 attached to a manual wheelchair 201 having a camber tube 202. The power add-on device 100 includes a housing 102. The housing 102 includes, therein, two conventional electric wheel-chair motors that are electrically coupled to a power source, and are arranged so that each drives a wheel 104. The manual wheelchair 201 can be attached to the power add-on device 100 simply by backing up the manual wheelchair 201 until a pair of latches 103 holds the camber tube of the manual wheelchair 201. Advantageously, no modification is required to the manual wheelchair 201.

Preferably, the latches 103 can be activated by an electric actuator so that when a user wants to de-couple the power add-on device 100 from the manual wheelchair 250, the user employs remote control 108 to activate the electric actuator so that the latches 103 assume an open position, releasing the manual wheelchair 250. Preferably, the remote control 108 is a conventional joystick or other such user-friendly remote control device.

Preferably, the power add-on device 100 can also be released manually, for example, by pulling a lever.

Preferably, the power add-on device 100 has built in recline and anti-tip features so the user can recline and relieve pressure from their seat cushion safely which is very important in order to avoid pressure sores. Preferably, the anti-tip feature is at least in part accomplished by employing front anti-tip castor wheel 107 and rear anti-tip castor wheel 106.

When the power add-on device 100 is attached to the manual wheelchair 250, the front anti-tip castor wheel 107 can be lifted several inches off the ground when encountering obstacles (preferably, as much as three inches). A notable design feature of the present invention is that the latches 103 are not tightly clamped down on the camber tube; instead, the latches 103 rather surround the camber tube, allowing the camber tube to rotate slightly as the manual wheelchair 250 tilts to allow the front wheels of the manual wheelchair to lift of the ground when encountering obstacles or when the user wishes to recline.

Preferably, the power add-on device 100 includes built-in armrests 109 on which the remote control 108 is mounted which operates the device. Preferably, the armrests 109 are mounted to the housing 102 using brackets 111, as shown.

Figure 3:
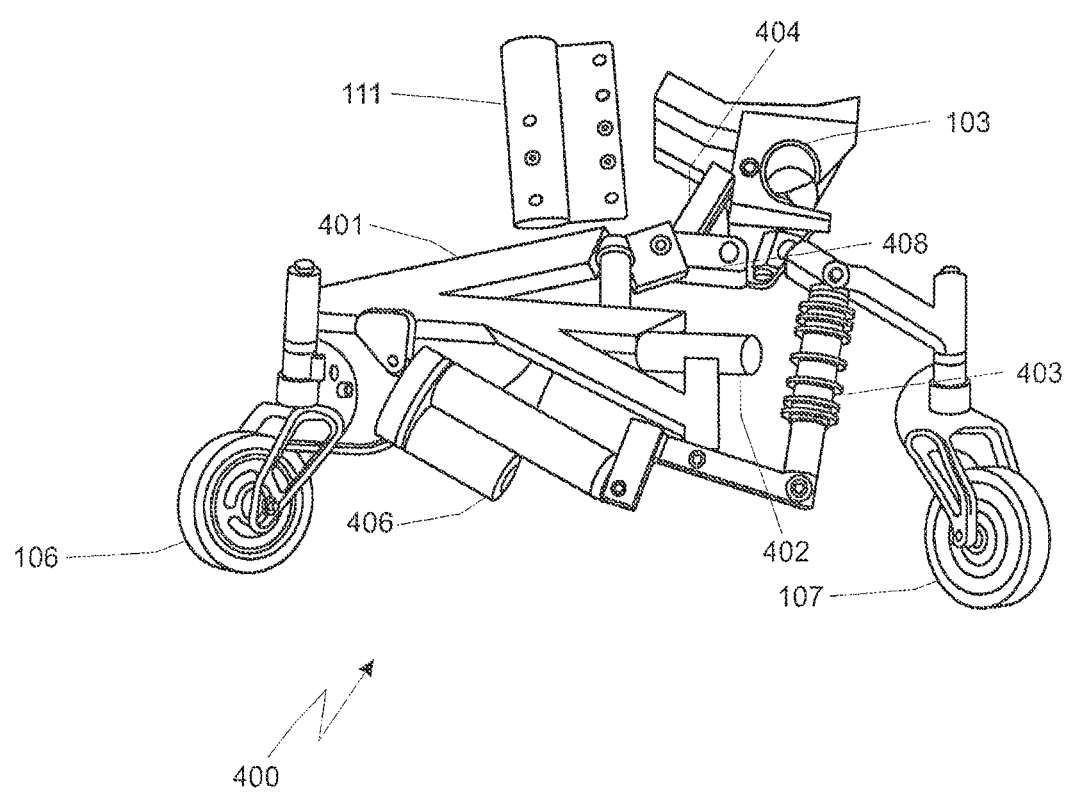
FIG. 3 shows the frame structure of the power add-on device of FIG. 1.
Figure 4:
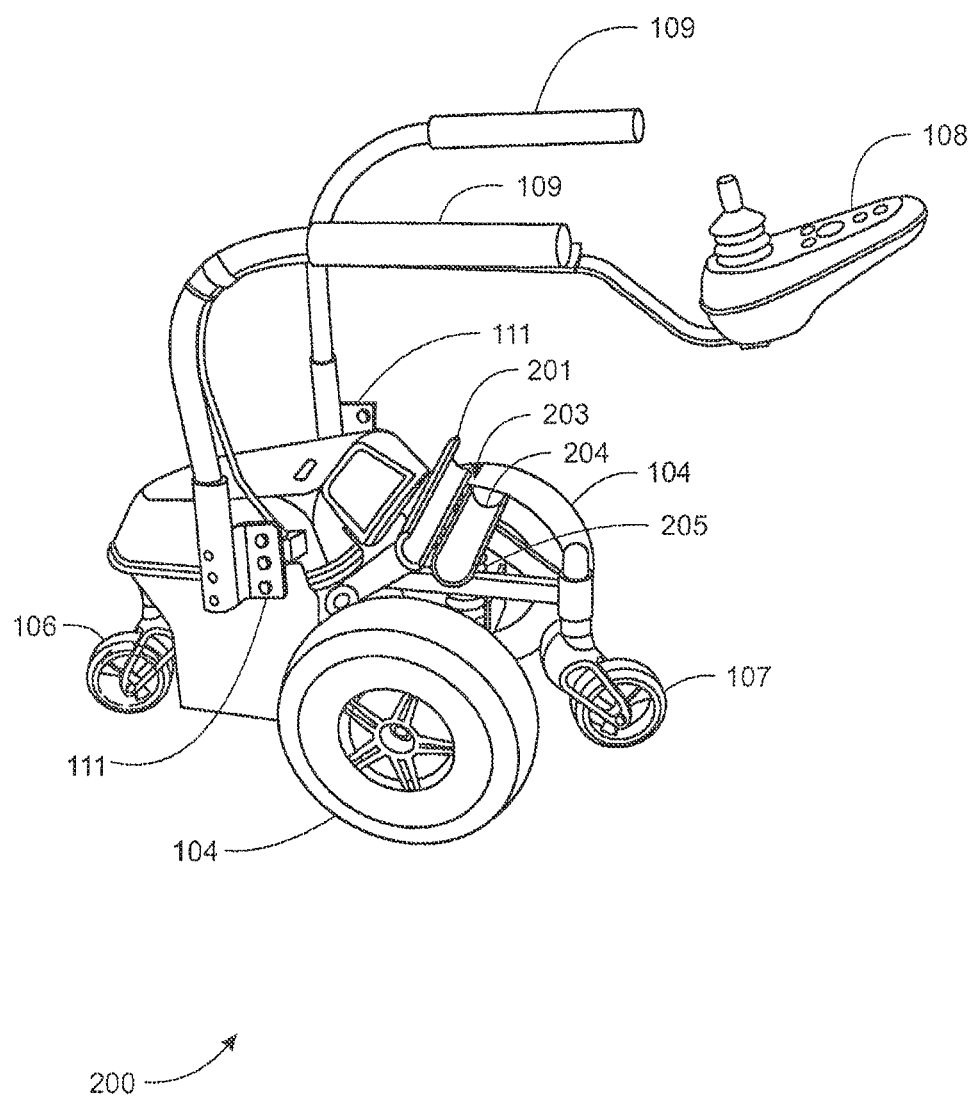
FIGS. 4 to 6 show an exemplary power add-on device for a manual wheelchair, in accordance with another preferred embodiment of the present invention.

Referring to FIG. 3, the framing structure 400 of the power add-on device 100 is shown. As depicted in FIG. 4, the framing structure 400 includes body frame 401, motor mount 402 (for securely holding the electric motors), coil-over shock absorber 403, rear anti-tip castor wheel 106 and front anti-tip castor wheel 107 (to prevent tipping, as discussed above), combination electric actuator 404 and latches 103 (to open the latching system and release the manual wheelchair 201, as discussed above), armrest mounts 111 (to secure the pair of armrests 109), and combination electric actuator 406/swing arm 408 (to allow the swing arm 408 to pivot upwardly, thereby raising the rear wheels of the manual wheelchair 250 off the ground and transferring the weight of the user from the rear wheels of the manual wheelchair through the shock-absorbed swing arm to provide traction to the power add-on's drive wheels). However, even when the rear wheels of the manual wheelchair 250 are positioned on the ground, relatively level terrain may still be traversed easily because the powered drive wheels 104 are lined up with the wheels of the manual wheelchair 250. In general, the higher the rear wheels of the manual wheelchair 250 are raised, the larger the obstacles that can be traversed. An additional benefit of this design is that it enables the user the advantage of additional height and reach capabilities for different everyday tasks.

Figure 5:
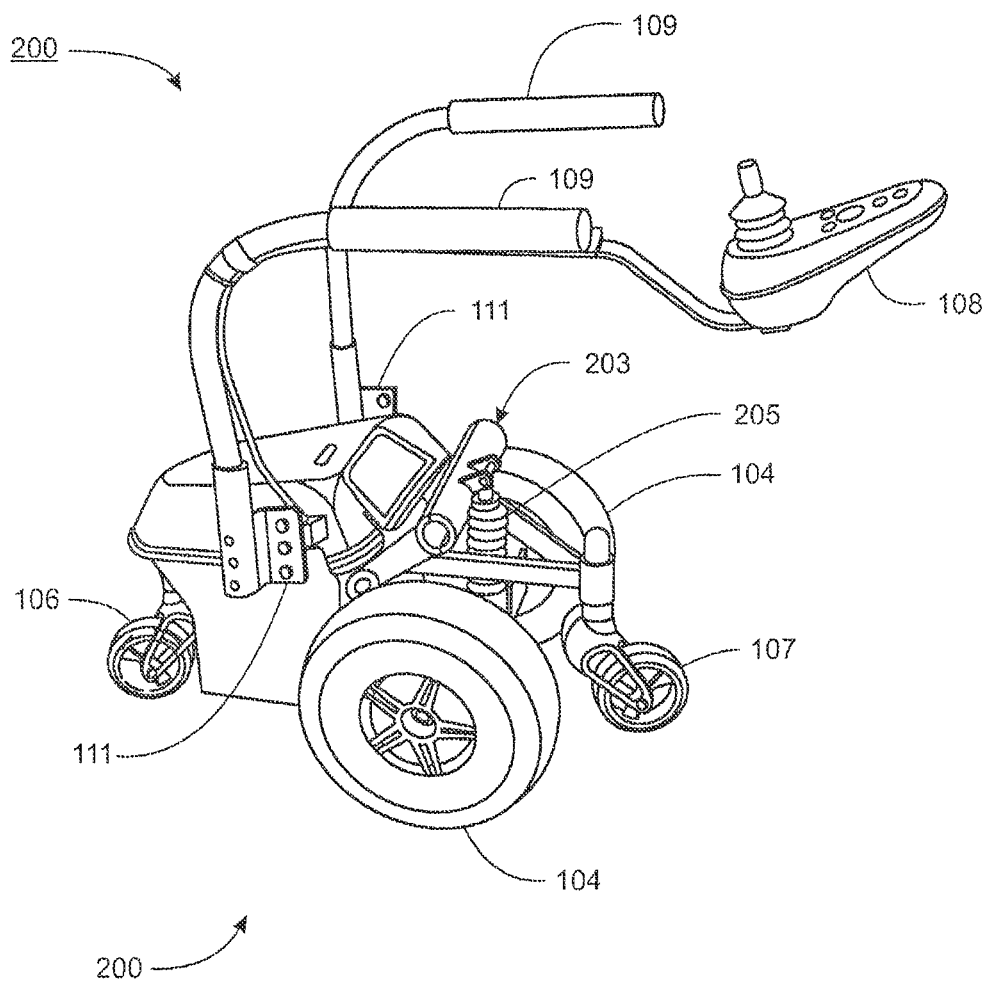
Figure 6:
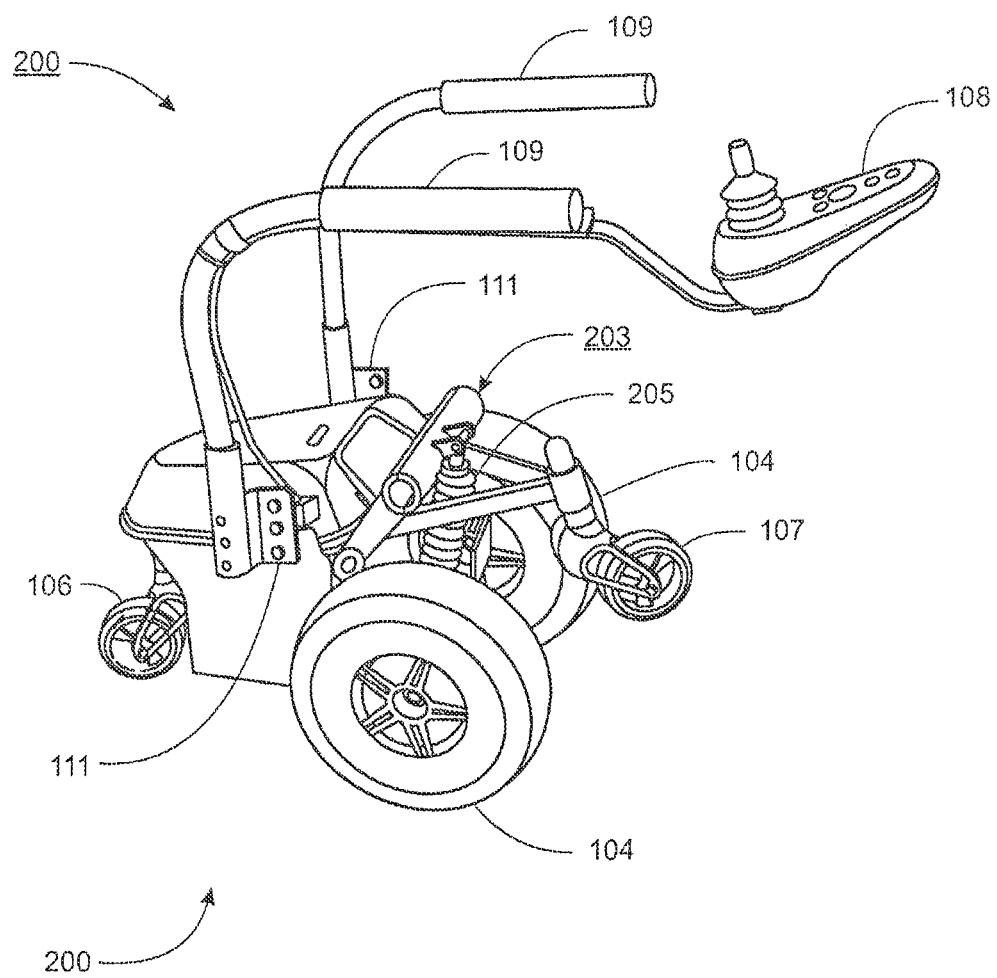

FIG. 4 Shows an alternate and preferred latching mechanism wherein the user backs up to an upper clamshell 201 of the latch 203 and then employs the remote control 108 to activate an electric actuator to close the latch 204 by lifting a lower clamshell 204, thereby securing the camber tube of the manual wheelchair to the power add-on device 100. As illustrated, the upper clamshell 201 and a bottom clamshell 204 are attached by at least one hinge. As shown in FIG. 4, the latch 203 is in an open position. FIG. 5 illustrates the latch 203 in a closed position. FIG. 6 illustrates that the front castor wheel 107 can be lifted off the ground by this mechanism as well to provide extra clearance of obstacles.

Figure 7:
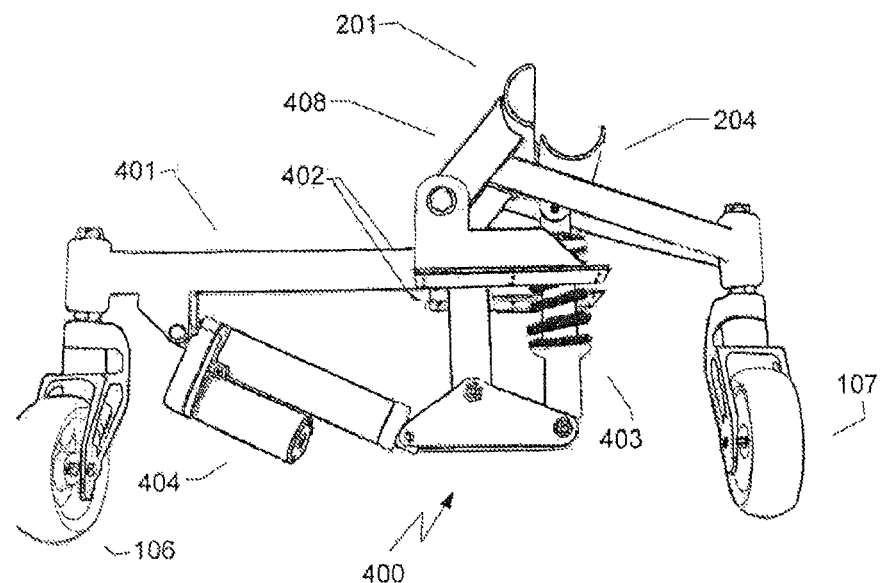
FIGS. 7 and 8 show the frame structure of the power add-on device of FIG. 4.
Figure 8:
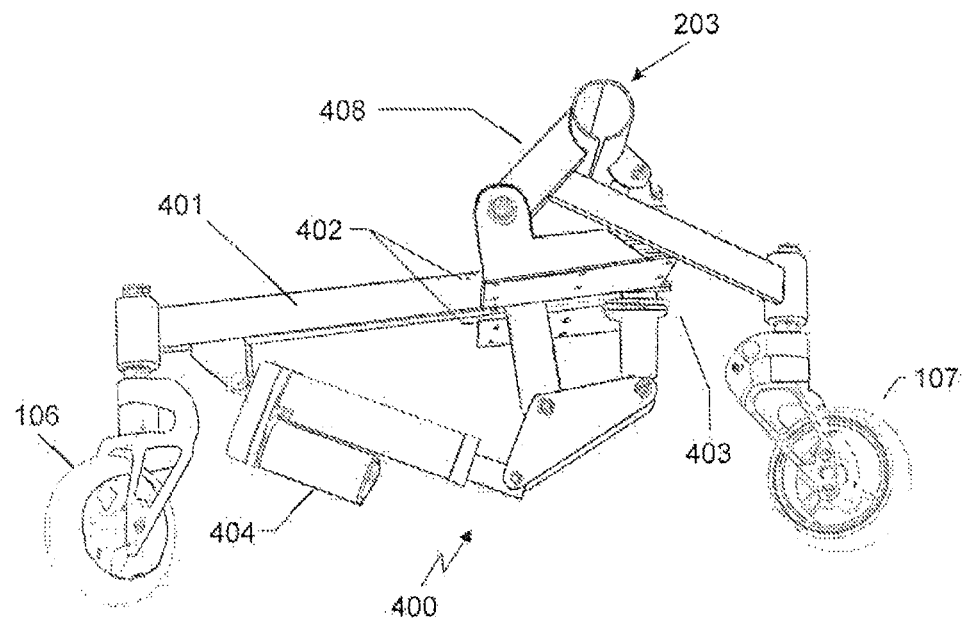

FIG. 7 illustrates the framing structure 400 of the power add-on device 100 with the alternate preferred latching mechanism discussed above. As depicted in FIG. 7, the electric actuator 404 is coupled to a pivot member 405, and the pivot member 405 is coupled to the coil-over shock absorber 403. In operation, as shown in FIG. 8, when the electric actuator 404 is activated, the electric actuator 404 applies force to the pivot member 405, and the pivot member 405 changes the direction of the force to upwardly apply the force to the coil-over shock absorber 403. As shown, the coil-over shock absorber 403 is coupled to the bottom clamshell 204, and the coil-over shock absorber 403 pushes the bottom clamshell 204 so as to close the latch 204.

Figure 9:
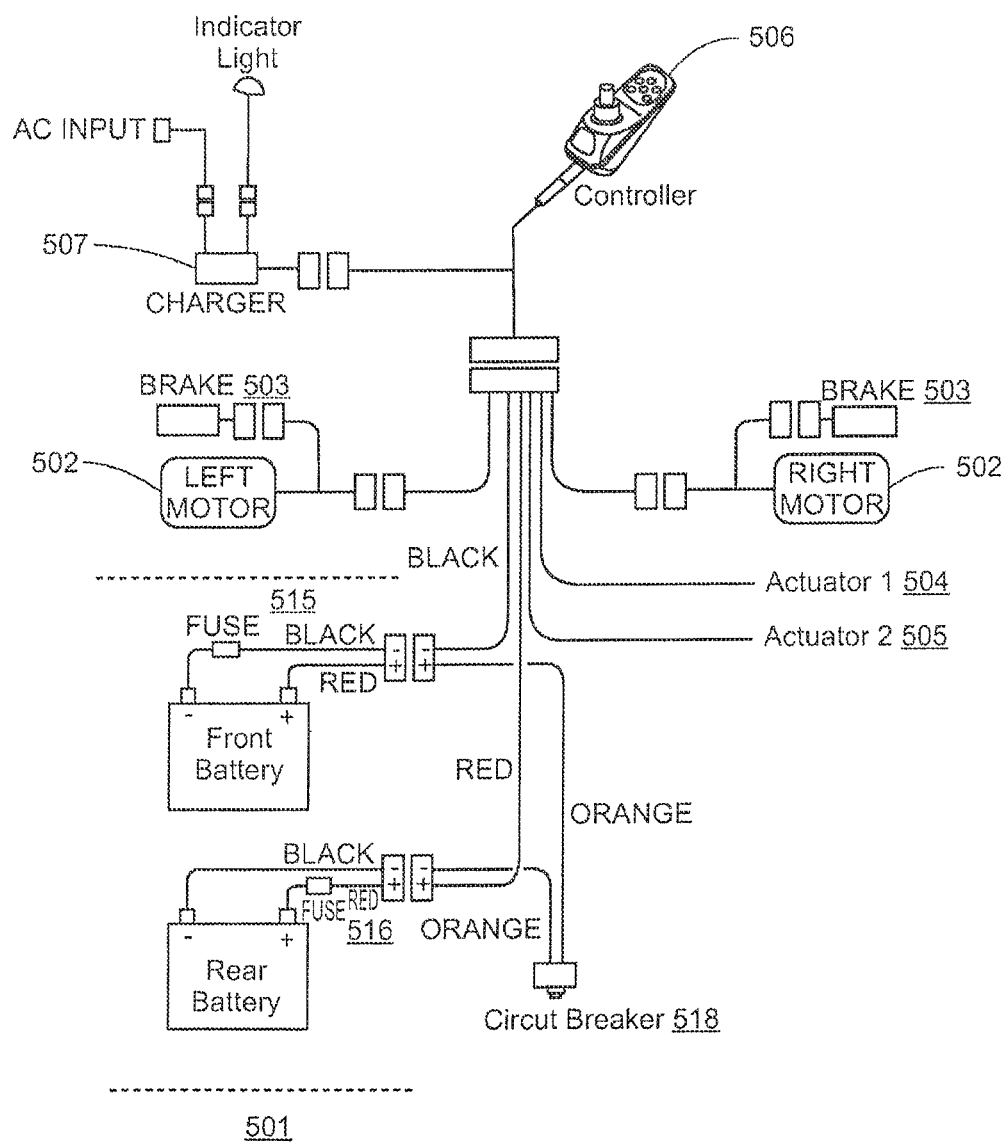
FIG. 9 shows a schematic view of the electrical components for the power add-on device.

FIG. 9 shows a schematic view of the electrical components for the power add-on device 100. As depicted in FIG. 5, the electrical system includes power source 501, motors 502, brakes 503, linear actuators 504, 505, controller 506, and charger 507.

The power source 501 comprises energy storage via batteries with charging and current limiting elements. The batteries are electrically connected in series, as shown, and provide all power for all functions. This configuration of battery power allows for use of standard batteries while providing the total output voltage needed for proper operation of the motors 502, actuators 503, 504, and brakes 503.

Since it is possible that either the motors 502 or the actuators 503, 504 can experience states of operation, such as short circuiting during a failure mode, which draw excessive power from the batteries, the batteries are each protected with current limiting elements. These current limiting elements comprise left battery fuse 515, right battery fuse 516, and circuit breaker 518. The circuit-opening characteristics of these current limiting elements preferably are selected based on allowing the circuit breaker first open-circuit followed by the fuses open-circuiting as the total current sourced from the batteries exceed the rated current discharge rate of the batteries.

The motors 502 are preferably direct current motors, sized preferably for propelling the manual wheelchair 201 and an adult user up at least a twenty degree grade. Similarly, the brakes are preferably direct-current-activated at the voltage of the two batteries when connected in series.

The actuator 504 is preferably a direct-current-powered actuator sized and preferably mounted under the frame so as to raise the swing arm 408, and thus lifting the rear of the manual wheelchair 201.

The actuator 505 is preferably a direct-current-powered actuator sized and preferably mounted so as to operate the latches 103, thereby releasing the wheelchair 201.

The controller 506 preferably includes wired or wireless remote actuator switches attached to a joystick/controller. Alternately, preferably, the actuator switches can be built into the joystick/controller. In either preferred configuration the actuator switches allow the operator to control the raising of the swing arm 408 (thus lifting the rear of the manual wheelchair 201), and operating the release lever (opening the latches 103 and releasing the manual chair 201), as shown.

Figure 10:
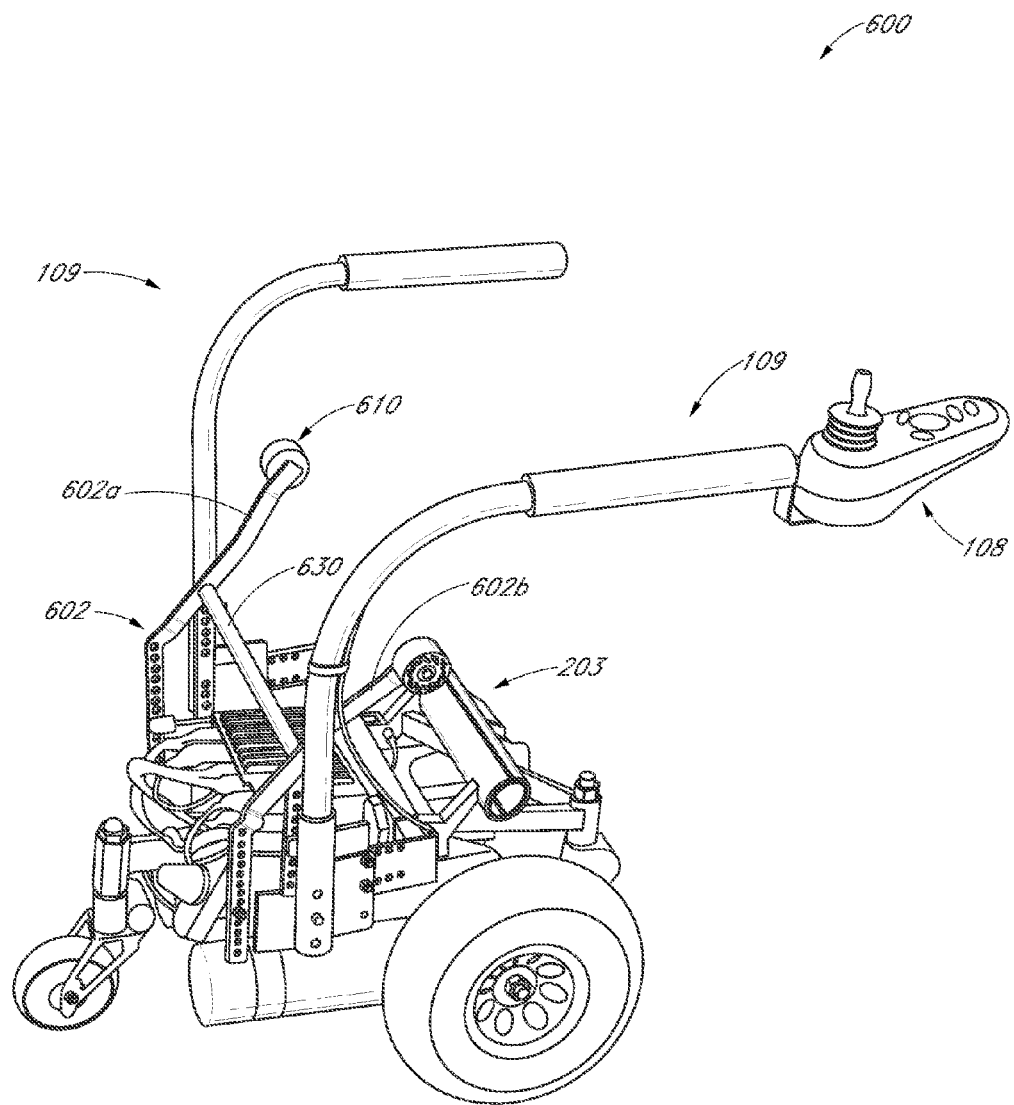
FIG. 10 shows an embodiment of a power add-on device having an embodiment of a rotation resistance element.
Figure 11:
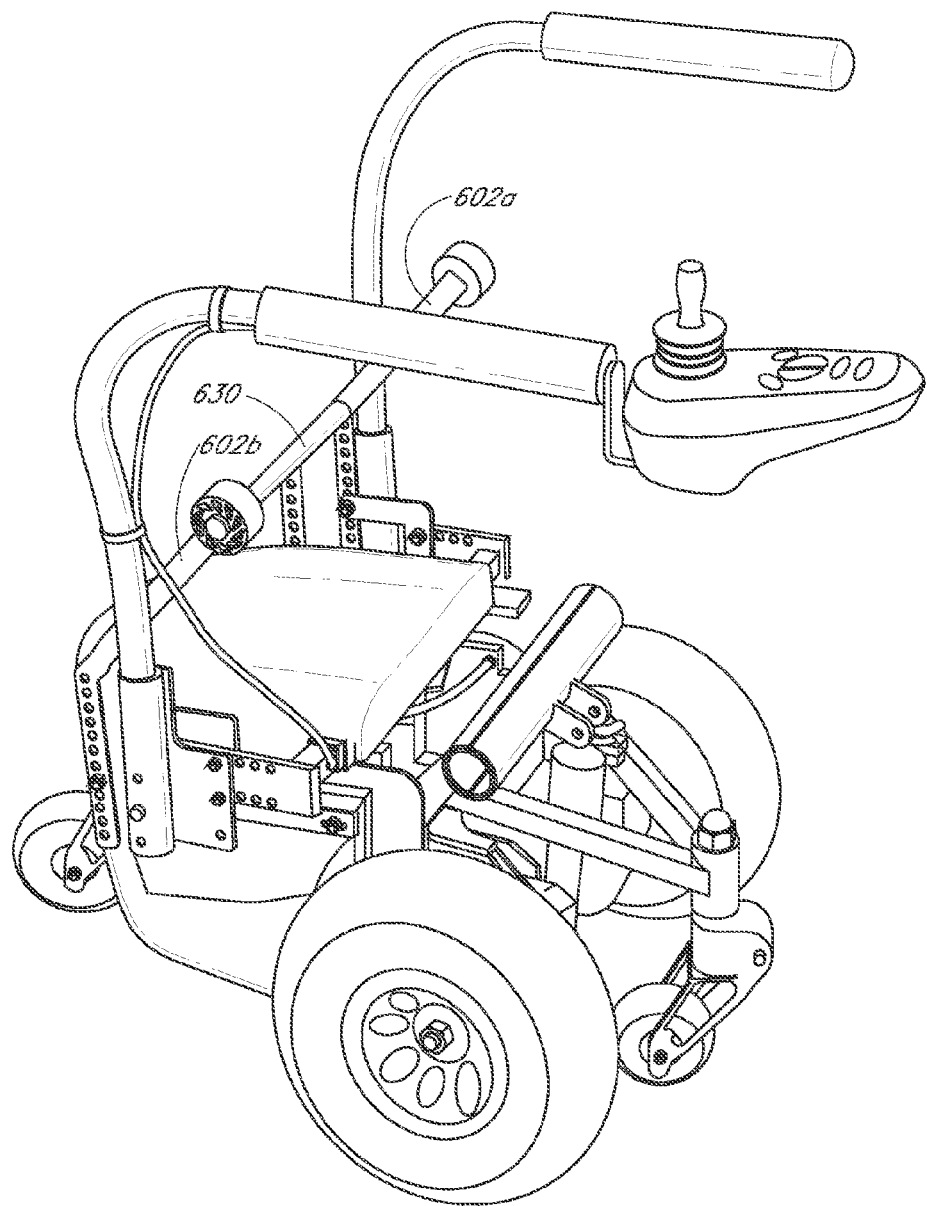
FIG. 11 shows another view of the embodiment of the power add-on device shown in FIG. 10.

Some embodiments of the power add-on device can be configured to minimize, dampen, and/or slow the rotation of the power add-on device relative to a manual chair coupled with the power add-on device. For example, with reference to FIGS. 10 and 11, in some embodiments, the power add-on device 600 can be configured to have a rotation limiting or dampening element or mechanism 602 (also referred to herein as an anti-tilt mechanism or a rotation resistance element) configured to minimize, dampen, and/or slow rotation between the power add-on device 600 and a manual wheelchair coupled with the power add-on device. Note that the manual wheelchair is not illustrated in either of FIG. 10 or 11.

As discussed above, at least some of the power add-on device embodiments disclosed herein can be coupled with a camber tube or similar component of the wheelchair, for example, by engaging the camber tube of the wheelchair with the engagement mechanism (which can be a clamshell engagement mechanism, latch mechanism, or other similar or suitable mechanism). Engaging the camber tube of the wheelchair can permit a desirable amount of rotation of the manual chair relative to the power add-on device. Such relative rotation can be beneficial, for example, for traversing changes in the slope or height of the ground surface. For example, when the power add-on device and wheelchair advance up or down a ramp, whether an upward sloping ramp or downward sloping ramp, there will likely be a point when the drive wheels of the power add-on device are at a different height or level than the front wheels of the wheelchair. Without permitting the rotation of the wheelchair relative to the power add-on device, such mismatch in the height of the drive wheels of the power add-on device relative to the front and/or the rear wheels of wheelchair can result in decreased stability and control of the wheelchair, and increased stress on the connection between the power add-on device and the wheelchair. Permitting such relative rotation therefore increases the stability, comfort, and overall performance of the power add-on device and wheelchair (i.e., the powered wheelchair system) and the ability of the powered wheelchair system to traverse uneven ground surfaces, bumps, and other changes in the ground surface.

However, there are also advantages to softening or resisting the amount of rotation between the power add-on device and the wheelchair, as too much relative rotation or quick rotation between the power add-on device and the wheelchair can affect the comfort level of the user, the control of the power add-on device, and the control of the remote control, such as the remote control 108. For example, in embodiments where the armrests 109 are secured to the power add-on device, and where the remote control is secured to the armrests, such as armrests 109, rapid or sudden, undampened rotation between the power add-on device and the wheelchair can cause relative rotation and movement between a user seated in the wheelchair and the armrests and remote control. This can reduce the comfort level of the user and the level of control the user has over the remote control.

In some embodiments, softening or dampening the amount of rotation between the power add-on device and the wheelchair can be achieved with the rotation resisting element 602 that can engage a rear facing surface of the wheelchair and prevent the power add-on device from over-tipping or over-tilting in a forward direction relative to the wheelchair and/or prevent the wheelchair from over-tipping or over-tilting in a rearward direction relative to the power add-on device.

Figure 12:
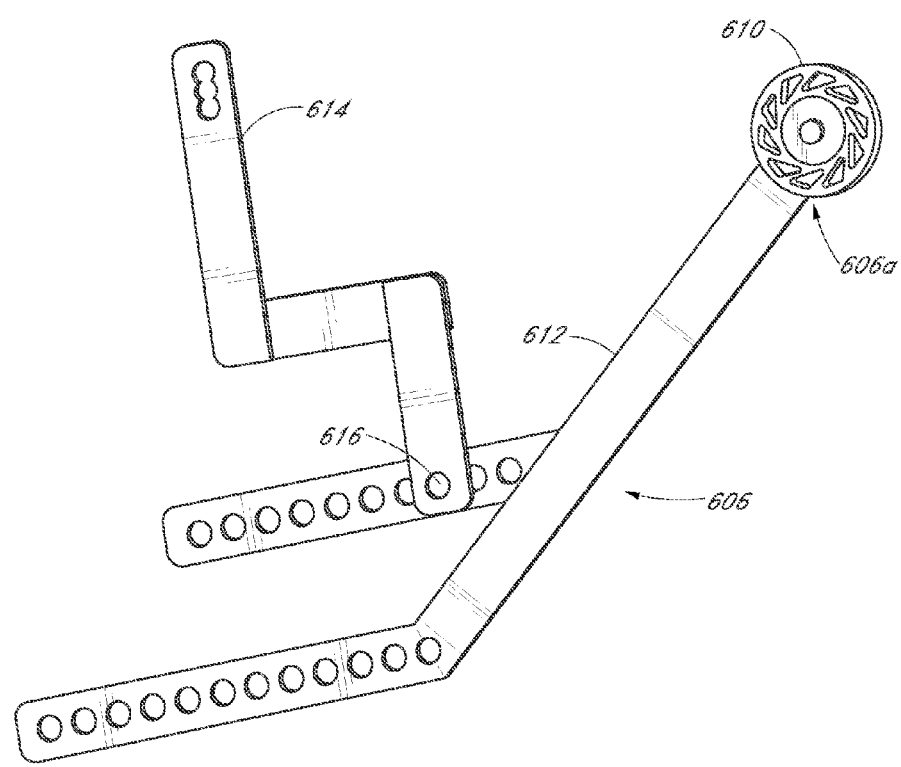
FIG. 12 shows an embodiment of a bracket assembly and roller member of the rotation resistance element of the embodiment of the power add-on device shown in FIG. 10.
Figure 18:
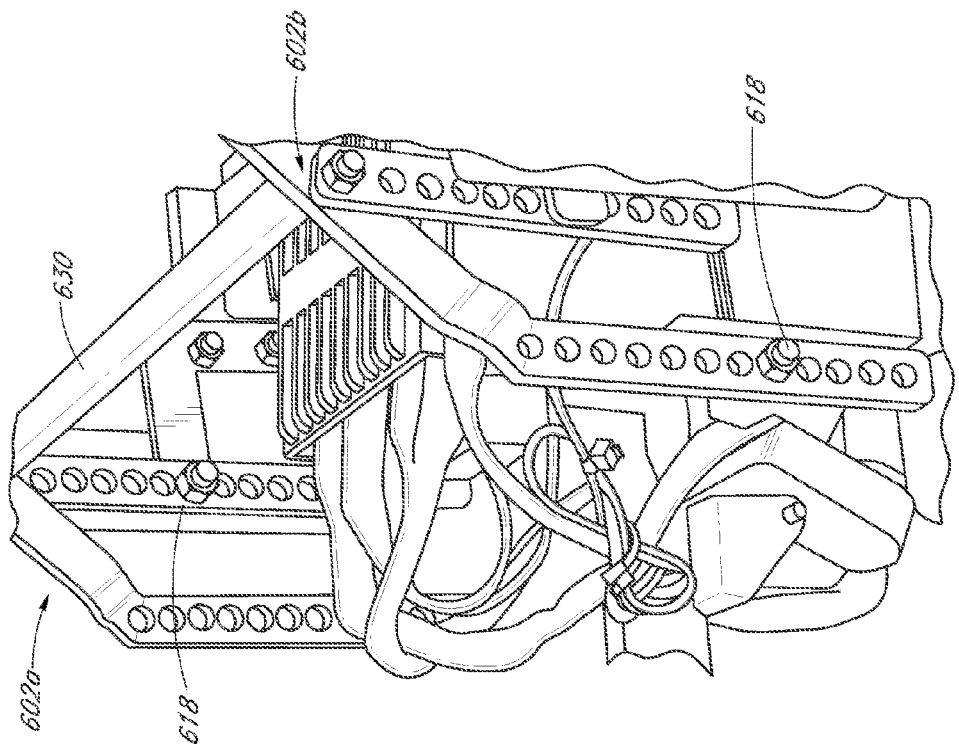
FIG. 18 shows a portion of the bracket assembly of the rotation resistance element attached to the power add-on device.
Figure 17:
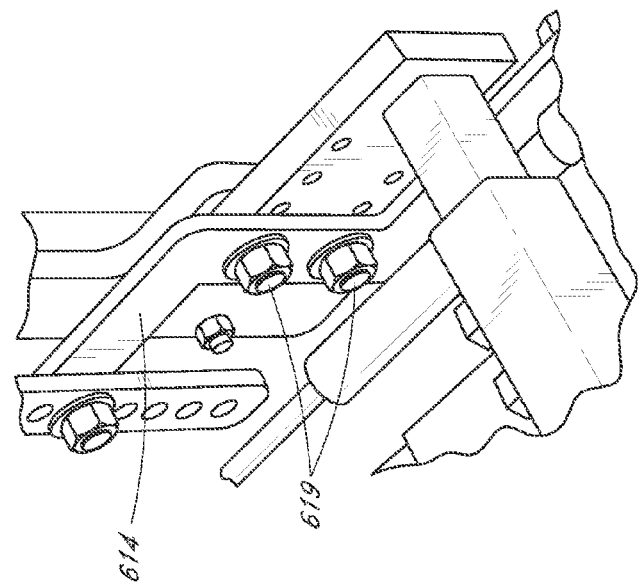
FIG. 17 shows a portion of the bracket assembly of the rotation resistance element attached to the power add-on device.

With reference to FIG. 12, some embodiments of the rotation resistance element 602 can have a bracket assembly 606 and roller member 610 secured to a distal end portion 606a of the bracket assembly. As will be discussed, the roller member 610 can contact a rear portion of the wheelchair and provide at least one of the contact points between the rotation resistance element 602 and the wheelchair. The roller member 610 can rotate in response to the contact between the wheelchair and the rotation resistance element 602, as the wheelchair rotates relative to the rotation resistance element and/or the rotation resistance element rotates relative to the wheelchair. In some embodiments, the bracket assembly 606 can have a first bracket element 612 and a second bracket element 614. The first bracket element 612 can support the roller member 610. As will be discussed, the first and second bracket elements 612, 614 can be fastened to one another and/or to the power add-on device using any suitable fastening mechanisms, including without limitation threaded fasteners such as bolts and nuts. For example, a fastener can be used to fasten the first bracket member 612 to the second bracket member 614 through opening 616. One example of a fastener that can be used to attach the first bracket member 612 to the second bracket member 614 through opening 616 is the threaded fastener 618 shown in FIG. 18. A similar threaded fastener 618 can be used to fasten the first end 620a of the spring member 620 to the first bracket member 612, as illustrated in FIG. 18. Similarly, similar fasteners such as threaded fasteners 619 can be used to secure the bracket assembly 606 to the power add-on device, as shown in FIG. 17.

Figure 13:
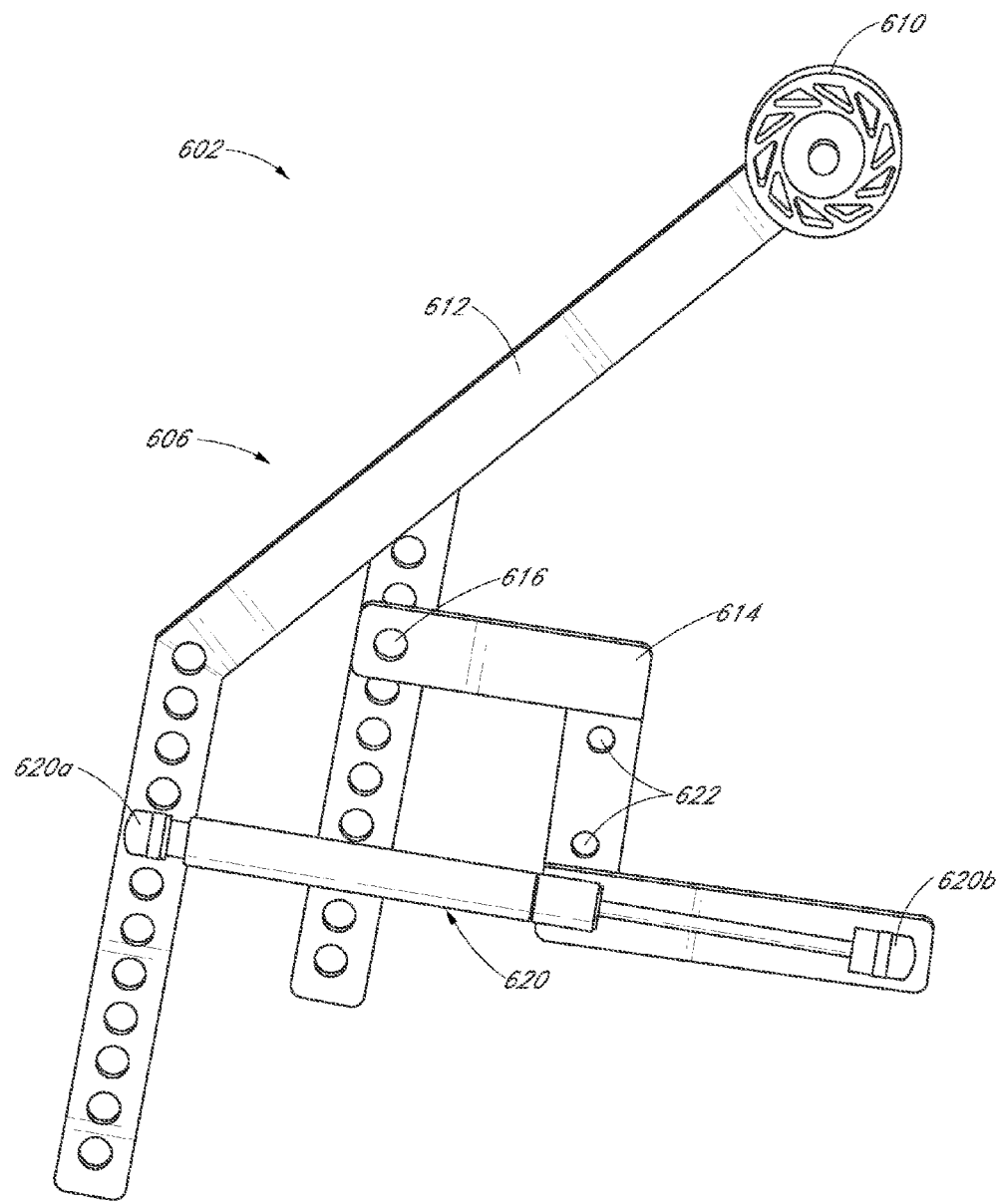
FIG. 13 shows the embodiment of the rotation resistance element of the embodiment of the power add-on device shown in FIG. 10, illustrating an embodiment of a gas spring component secured to the bracket assembly of the rotation resistance element.
Figure 15:
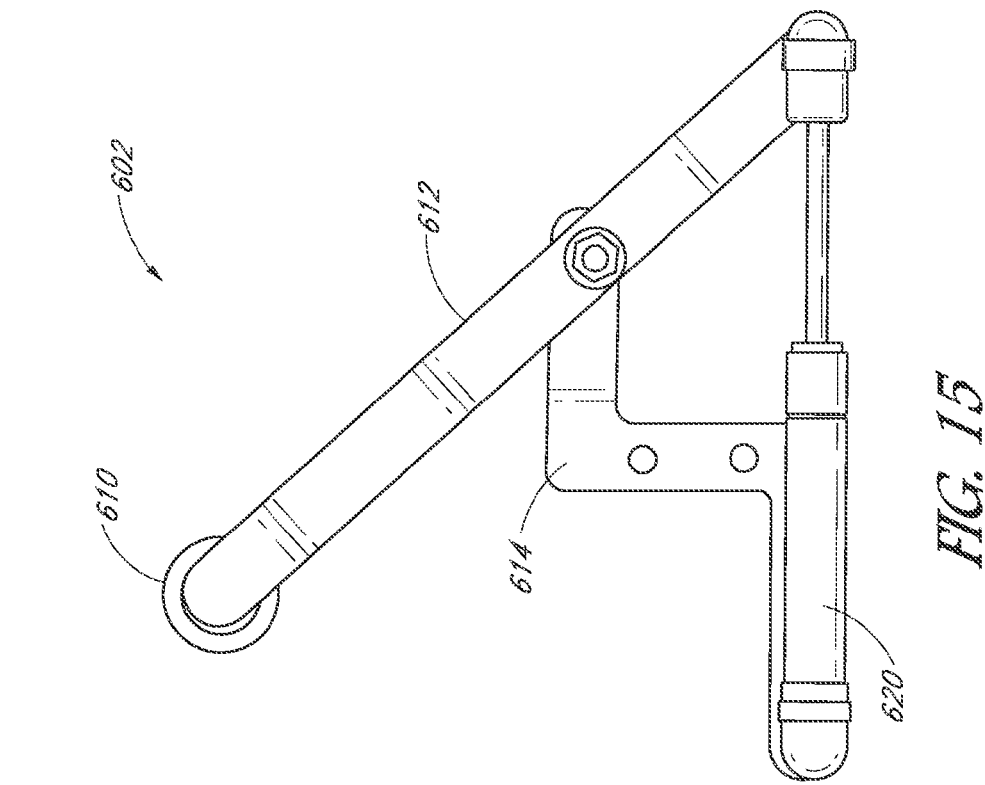
FIG. 15 shows another view of the embodiment of the rotation resistance element shown in FIG. 13.
Figure 14:
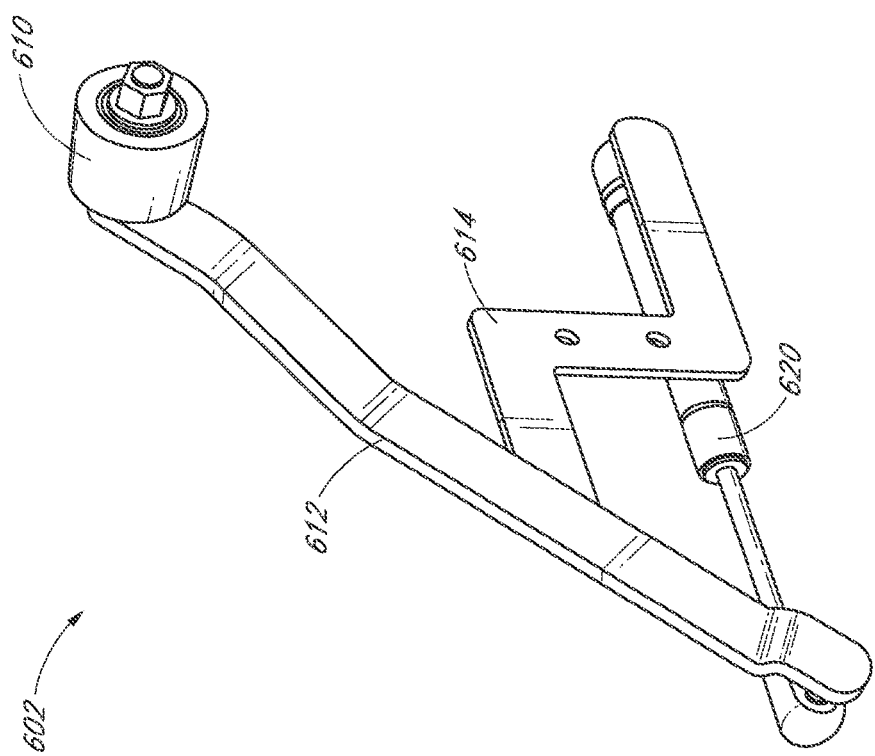
FIG. 14 shows another view of the embodiment of the rotation resistance element of FIG. 13.

With reference to FIG. 13, some embodiments of the rotation resistance element can have a spring mechanism 620, such as but not limited to a gas spring component, secured to the bracket assembly 606. For example and without limitation, a first end portion of the spring mechanism 620a can be secured to the first bracket member 612, and a second end portion of the spring mechanism 620b can be secured to the second bracket mechanism 614. Openings 622 can be used to secure the bracket assembly 606 to a frame portion or other support member on the power add-on device.

Any embodiments of the power add-on device disclosed herein can have one or more rotation resistance elements 602 to resist the relative rotation of the power add-on device relative to the wheelchair. In some embodiments, as in the embodiments illustrated in FIGS. 10, 11, and 16, inter alia, the power add-on device can have two rotation resistance elements 602, one on each lateral side of the power add-on device. Additionally, though not required, the first rotation resistance element 602a and the second rotation resistance element 602b can be interconnected with a lateral support member 630 that can be, but is not required to be, secured to the bracket assembly 606 of each of the first rotation resistance element 602a and the second rotation resistance element 602b.

Figure 19:
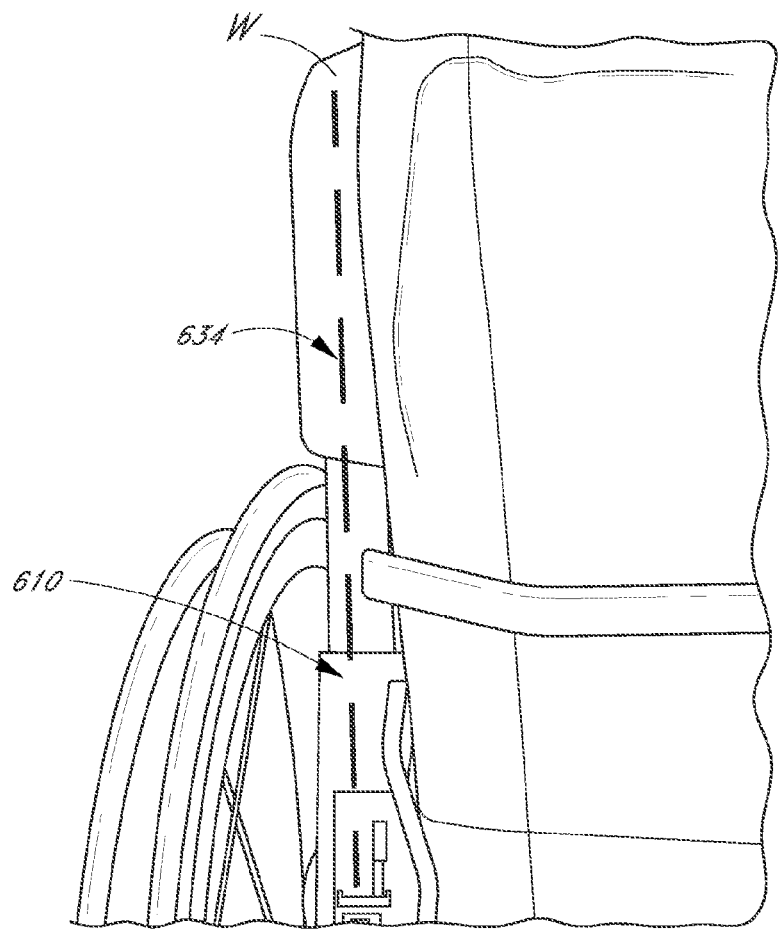
FIG. 19 shows a rear view of a portion of the rotation resistance element in a first or relaxed position relative to a wheelchair.

As shown in FIG. 19, some embodiments of the power add-on device can be configured such that the rotation resistance element 602 can be aligned with a frame portion of the wheelchair, designated with "W" in FIG. 19. For example, the rotation resistance element 602 can be positioned such that a centerline 634 of the roller member 610 can be approximately aligned with a centerline 634 of a vertical tube member of the wheelchair. In some embodiments, the roller member 610 can be aligned with any suitable member or surface on the wheelchair, whether it be the frame or otherwise.

Figure 21:
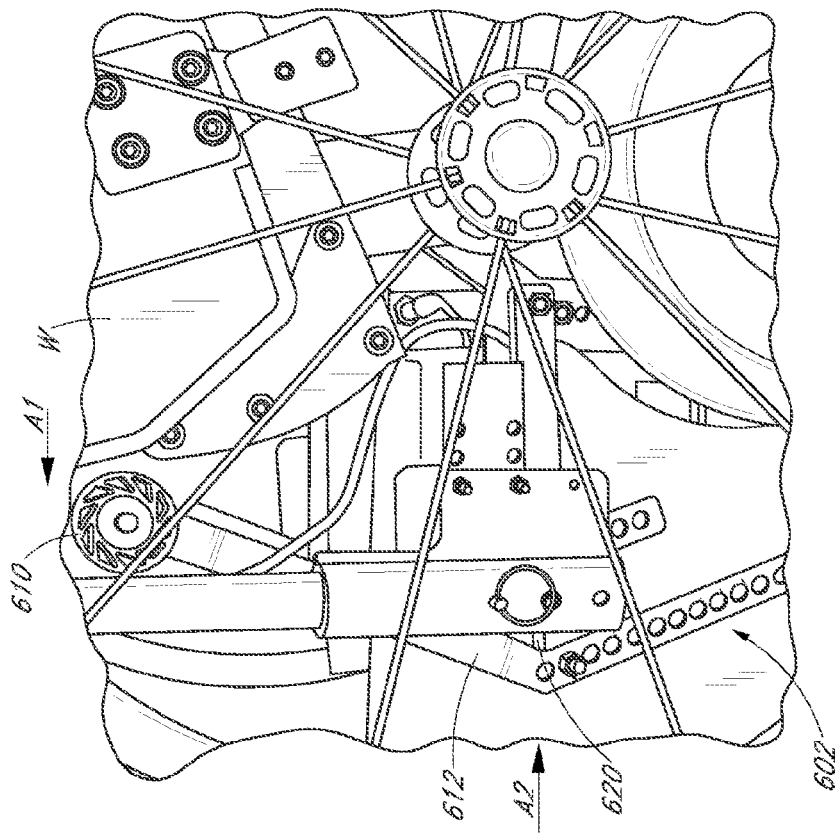
FIG. 21 shows a side view of a portion of the rotation resistance element in a second or rotated position relative to a wheelchair.
Figure 20:
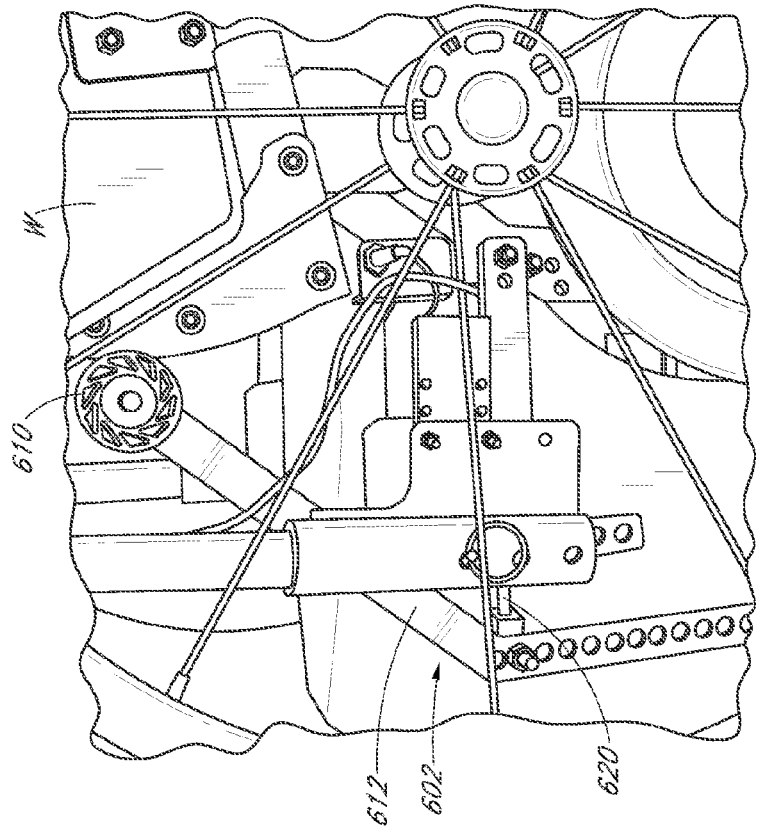
FIG. 20 shows a side view of a portion of the rotation resistance element in a first or relaxed position relative to a wheelchair.

FIG. 20 shows a side view of a portion of the rotation resistance element 602 in a first or relaxed position relative to a wheelchair. FIG. 21 shows a side view of a portion of the rotation resistance element 602 in a second or rotated position relative to a wheelchair. As can be seen with reference to FIGS. 20 and 21, rotating the wheelchair 610 in the direction designated by arrow A1 relative to the power add-on device can cause the first bracket 612 of the rotation resistance element 602 to rotate in the direction A1 about the fastener or axle positioned in opening 616 relative to the second bracket 614. As a result, the second bracket 612 can compress the spring member 620, which can be configured to resist the rotation of the first bracket member 612 about the fastener or axle positioned in opening 616. In this arrangement, the rotation resistance element 602 can resist and slow the rotation of the wheelchair relative to the power add-on device 600. Any of the features of the power add-on device 600 and/or the rotation resistance element 602 can be used with any of the other features or components of any of the other power add-on device embodiments disclosed herein.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A power add-on device for powering a manual wheelchair having rear wheels, comprising:
a support structure;
a set of drive wheels supported by the support structure;
a motorized component supported by the support structure, the motorized component comprising dual electric motors and a power source electrically coupled to the electric motors, wherein each of the electric motors is configured to turn a respective one of a set of drive wheels to propel the manual wheelchair removably coupled with the power add-on device;
an engagement mechanism adapted to selectively and removably couple the power add-on device to a portion of the manual wheelchair, the engagement mechanism being configured to engage with the wheelchair in a manner that permits the wheelchair to rotate relative to the engagement mechanism; and
a rotation resistance element comprising a damping member configured to inhibit rotation of the wheelchair relative to the power add-on device and/or rotation of the power add-on device relative to the wheelchair;
wherein:
the rotation resistance element is movable between a first position and a second position;
the rotation resistance element is configured to move in a first direction toward the second position in response to a force exerted on the rotation resistance element from the wheelchair;
the damping member is configured to bias the rotation resistance element in a second direction toward the first position and to dampen the movement of the rotation resistance element in the first direction, the second direction being opposite to the first direction.

2. The power add-on device of claim 1, comprising a second rotation resistance element supported by the support structure, wherein the rotation resistance element and the second rotation resistance element are configured to contact the wheelchair at different locations.

3. The power add-on device of claim 2, wherein the rotation resistance element and the second rotation resistance element are interconnected by a lateral support member.

4. The power add-on device of claim 1, wherein the rotation resistance element is configured to rotate about a shaft secured to the support structure.

5. The power add-on device of claim 1, wherein the rotation resistance element further comprises a roller member configured to contact a rear surface of the wheelchair engaged with the power add-on device.

6. The power add-on device of claim 1, further including an anti-tip mechanism, the anti-tip mechanism comprising at least one of a front anti-tip castor wheel coupled with the support structure and a back anti-tip castor wheel coupled with the support structure.

7. The power add-on device of claim 1, further including a set of armrests supported by the support structure.

8. The power add-on device of claim 1, wherein the engagement mechanism is configured to surround a camber tube of the manual wheelchair, wherein:
the wheelchair has one or more front wheels; and
the engagement mechanism is configured to permit the camber tube to rotate when the one or more front wheels of the manual wheelchair are lifted.

9. The power add-on device of claim 1, wherein, when attached to the manual wheelchair, the drive wheels and the rear wheels of the manual wheelchair are substantially aligned in a forward/aft position, such that an axle or axles of the drive wheels are substantially aligned in a forward/aft direction relative to an axle or axles of the rear wheels of the manual wheelchair.

10. The power add-on device of claim 1, wherein the engagement mechanism is further adapted to couple the power add-on device to a camber tube of the manual wheelchair.

11. The power add-on device of claim 10, further comprising a clamshell engagement mechanism, wherein, when the clamshell engagement mechanism is in a closed position, the camber tube of the manual wheelchair is surrounded by the clamshell engagement mechanism.

12. The power add-on device of claim 1, wherein the engagement mechanism includes at least one electric actuator.

13. The power add-on device of claim 1, wherein the engagement mechanism includes at least one electric actuator controllable by a controller.

14. The power add-on device of claim 1, wherein the engagement mechanism comprises a clamshell engagement mechanism.

15. The power add-on device of claim 14, wherein the clamshell engagement mechanism includes an upper clamshell portion and a bottom clamshell portion, the upper clamshell portion being hingeably attached to the bottom clamshell portion.

16. A power add-on device for powering a manual wheelchair having rear wheels, comprising:
   a support structure;
   a set of drive wheels supported by the support structure;
   a motorized component supported by the support structure, the motorized component comprising at least one electric motor and a power source electrically coupled to the electric motors, wherein each of the electric motors is configured to turn a respective one of a set of drive wheels to propel the manual wheelchair removably coupled with the power add-on device;
   an engagement mechanism adapted to selectively and removably couple the power add-on device to a portion of the manual wheelchair, the engagement mechanism being configured to engage with the wheelchair in a manner that permits the wheelchair to rotate relative to the engagement mechanism; and
   a rotation resistance element configured to inhibit rotation of the wheelchair relative to the power add-on device and/or rotation of the power add-on device relative to the wheelchair;
   wherein the rotation resistance element further comprises a spring member configured to resist the rotation of the rotation resistance element relative to the support structure.

17. The power add-on device of claim 16, wherein the engagement mechanism is configured to surround a camber tube of the manual wheelchair, wherein: the wheelchair has one or more front wheels; and the engagement mechanism is configured to permit the camber tube to rotate when the one or more front wheels of the manual wheelchair are lifted.

18. The power add-on device of claim 16, wherein the engagement mechanism is further adapted to detach the power add-on device from a camber tube of the manual wheelchair.

19. The power add-on device of claim 16, the at least one electric motor comprises dual electric motors, wherein the power source is electrically coupled to the dual electric motors and each of the dual electric motors is configured to turn a respective one of a set of drive wheels to propel the manual wheelchair removably coupled with the power add-on device.

20. The power add-on device of claim 16, comprising a second rotation resistance element supported by the support structure, wherein the rotation resistance element and the second rotation resistance element are configured to contact the wheelchair at different locations and wherein the rotation resistance element and the second rotation resistance element are interconnected by a lateral support member.

21. The power add-on device of claim 16, wherein the rotation resistance element is configured to rotate about a shaft secured to the support structure.

22. The power add-on device of claim 16, further including a set of armrests supported by the support structure.

23. The power add-on device of claim 16, wherein the engagement mechanism includes at least one electric actuator controllable by a controller and the engagement mechanism is adapted to couple the power add-on device to a camber tube of the manual wheelchair.

24. The power add-on device of claim 16, wherein the engagement mechanism comprises a clamshell engagement mechanism, wherein, when the clamshell engagement mechanism is in a closed position, the camber tube of the manual wheelchair is surrounded by the clamshell engagement mechanism.

25. A power add-on device for powering a manual wheelchair having rear wheels, comprising:
   a support structure;
   a set of drive wheels supported by the support structure;
   a motorized component supported by the support structure, the motorized component comprising at least one electric motor and a power source electrically coupled to the one or more electric motors, wherein each of the one or more electric motors is configured to turn a respective one of a set of drive wheels to propel the manual wheelchair removably coupled with the power add-on device;
   an engagement mechanism adapted to selectively and removably couple the power add-on device to a portion of the manual wheelchair, the engagement mechanism being configured to engage with the wheelchair in a manner that permits the wheelchair to rotate relative to the engagement mechanism; and
   a rotation resistance element configured to inhibit rotation of the wheelchair relative to the power add-on device and/or rotation of the power add-on device relative to the wheelchair;
   wherein the rotation resistance element further comprises a roller member configured to contact a rear surface of the wheelchair engaged with the power add-on device.

26. The power add-on device of claim 25, wherein the engagement mechanism is configured to surround a camber tube of the manual wheelchair, wherein:
   the wheelchair has one or more front wheels; and
   the engagement mechanism is configured to permit the camber tube to rotate when the one or more front wheels of the manual wheelchair are lifted.

27. The power add-on device of claim 25, the at least one electric motor comprises dual electric motors, wherein the power source is electrically coupled to the dual electric motors and each of the dual electric motors is configured to turn a respective one of a set of drive wheels to propel the manual wheelchair removably coupled with the power add-on device.

28. The power add-on device of claim 25, comprising a second rotation resistance element supported by the support structure, wherein the rotation resistance element and the second rotation resistance element are configured to contact the wheelchair at different locations and wherein the rotation resistance element and the second rotation resistance element are interconnected by a lateral support member.

29. The power add-on device of claim 25, wherein the rotation resistance element is configured to rotate about a shaft secured to the support structure.

30. The power add-on device of claim 25, further including a set of armrests supported by the support structure.

31. The power add-on device of claim 25, wherein the engagement mechanism includes at least one electric actuator controllable by a controller and the engagement mechanism is adapted to couple the power add-on device to a camber tube of the manual wheelchair.

32. The power add-on device of claim 25, wherein the engagement mechanism comprises a clamshell engagement mechanism, wherein, when the clamshell engagement mechanism is in a closed position, the camber tube of the manual wheelchair is surrounded by the clamshell engagement mechanism.

33. The power add-on device of claim 25, further including an anti-tip mechanism, the anti-tip mechanism comprising at least one of a front anti-tip castor wheel coupled with the support structure and a back anti-tip castor wheel coupled with the support structure.

* * * * *